July 15, 1969     A. MARTIN     3,455,243
OPTICAL DISTANCE DETECTING DEVICES
Filed Oct. 2, 1956     7 Sheets-Sheet 1

INVENTOR
Alphonse Martin
BY
Bailey Stephens & Huettig
ATTORNEYS

INVENTOR
Alphonse Martin
BY
Bailey, Stephens & Huettig
ATTORNEYS

INVENTOR
Alphonse Martin
BY
Bailey, Stephens & Huettig
ATTORNEYS

July 15, 1969   A. MARTIN   3,455,243
OPTICAL DISTANCE DETECTING DEVICES
Filed Oct. 2, 1956   7 Sheets-Sheet 6

INVENTOR
Alphonse Martin
BY
ATTORNEYS

Fig.12

United States Patent Office 3,455,243
Patented July 15, 1969

3,455,243
OPTICAL DISTANCE DETECTING DEVICES
Alphonse Martin, 4 Place de la Republique,
Saint-Ouen, Seine-St.-Denis, France
Filed Oct. 2, 1956, Ser. No. 613,551
Claims priority, application France, Oct. 4, 1955,
700,141, 700,164; Nov. 14, 1965, 56,193
Int. Cl. F42c 13/02
U.S. Cl. 102—70.2                                    3 Claims The present invention relates to optical distance detecting devices, i.e. devices responsive to variation of their distance from an object. Such devices may be used either merely as distance indicators or to perform a given operation (for instance to cause a projectile to burst) when the distance from the device to the object is equal to a given value.

There are such optical distance detecting devices which are based upon variation of the intensity of the light flux which is received by the device. But experience taught that such a variation is not exactly indicative of the variation of distance of the device from the object. Furthermore such devices are greatly influenced by variations in the illumination of the surrounding atmosphere.

The object of my invention is to provide an optical distance detecting device which avoids these drawbacks.

My device is based upon the fact that the real image that is given by suitable optical means in an image plane located at a given distance from said optical means is sharp and capable of presenting sharp differences of illumination between different areas thereof only for objects located in the object plane conjugate of said image plane with respect to said optical means, whereas the image of all things located outside of said conjugate image plane presents no sharp difference of illumination between different areas thereof.

Now, it is possible to provide differential photo-sensitive means capable of giving an electric signal in response to an instantaneous sharp difference of illumination between two adjoining areas in which said photo-sensitive means are located, whereas such photo-sensitive means will not respond to gradual differences of illumination as exist between different areas of a blurred image.

The distance detecting device according to my invention consists therefore in the combination of a casing including optical means for forming in an image plane fixed with respect to said casing a sharp real image of everything located in the field of said optical means in an object plane conjugate of said image plane with respect to said optical means, with differential photo-sensitive means carried by said casing in said image plane and mounted for giving an electrical signal in response to an instantaneous sharp difference of illumination between two adjoining areas of said image plane, said photo-sensitive means being non-responsive to the gradual differences of illumination that exist between adjoining areas of a blurred image.

Preferred embodiments of my invention will be hereinafter described with reference to the accompanying drawings, given merely by way of example and in which.

It will first be supposed that the device according to my invention is intended to give an electric signal when an object having limited dimensions, and in particular an aircraft, outlined against a background of substantially uniform illumination is located at a given distance from said device. In this case such a device includes, inside an opaque casing, two photo-sensitive cells, of substantially equal respective active areas, said cells having for instance the shape of surfaces of revolution about the optical axis of an objective lens carried at the front of said casing, one of these cells being circular and the other being in the form of an annulus surrounding said first mentioned cell. The plane of the said two active areas is a plane at right angles to the optical axis of the objective. With such an arrangement, the image formed by the objective in said plane is blurred and spreads over the whole of these two cells for all objects located outside of the plane conjugate of said plane of the photo-sensitive cells with respect to the objective. In these conditions the two cells exert actions which balance to each other and nothing takes place. On the contrary, when there is an object located in said conjugate object plane, the image is sharp and is localized on only one of the two cells, whereby there is an unbalance between the actions of said cells and an electric signal can be produced.

Figure 1:
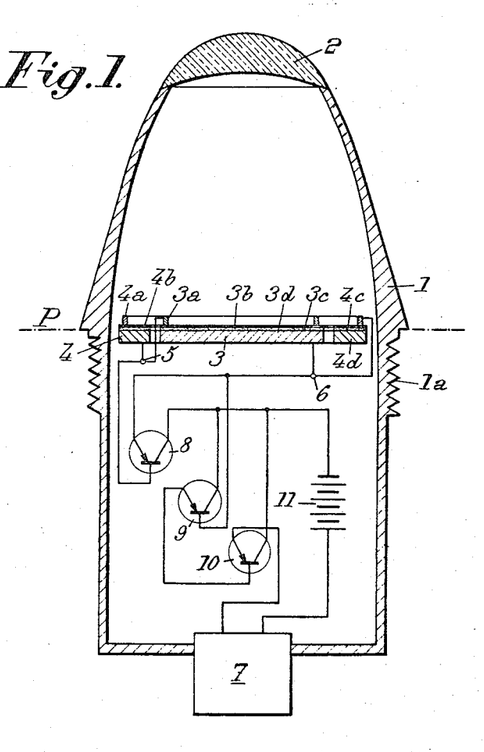
FIG. 1 is an axial sectional view of a proximity fuze according to my invention for anti-aircraft firing.

FIG. 1 shows a proximity fuze including a casing 1 made of an opaque material provided with a threaded portion 1a to fix it on a shell or other projectile (not shown). The front portion of casing 1 (which is of ogival shape) is adapted to conform with the general shape of the projectile. It carries an objective 2, preferably of the wide angle lens type. Inside the casing are disposed two photo-sensitive cells 3 and 4 such as above described. Their common axis is in coincidence with the optical axis of objective 2, which is also the same as the longitudinal axis of symmetry of the projectile.

The focal length of objective 2 and the distance between this objective and the plane P of the two cells are chosen in accordance with the desired value of the distance from the target at which the projectile is to burst. This distance is that at which the target is located from the device when the image of said target in plane P is sharp.

Cells 3 and 4 are for instance photo-electric cells of the barrier-layer type with negative annular collectors $3a$, $4a$, semi-transparent metal electrodes $3b$, $4b$, semi-conductor elements $3c$, $4c$ and positive collectors $3d$, $4d$. The collectors of the two cells are connected in opposition with two terminals 5 and 6, the negative collector $3a$ of the central cell and the positive collector $4d$ of the annular cell being both connected with the same terminal 5, whereas the negative collector $4a$ of the annular cell and the positive collector $3d$ of the central cell are both connected with the other terminal 6.

Any current as may be collected across terminals 5 and 6 is transmitted, after amplification, to the electric primer of a detonator 7. It may use for this purpose a conventional electronic amplifier with midget tubes but it seems to be preferable to make use of a transistor amplifier.

In the transistor amplifier shown by FIG. 1, the mounting is such that a signal is produced only by the unbalance due to the formation of the target image exclusively on the annular cell 4, but when the image is formed exclusively on the central cell 3, nothing takes place. Such an amplifier is constituted by three stages of junction type transistors 8, 9 and 10 fed with current from a battery element 11.

Figure 2:
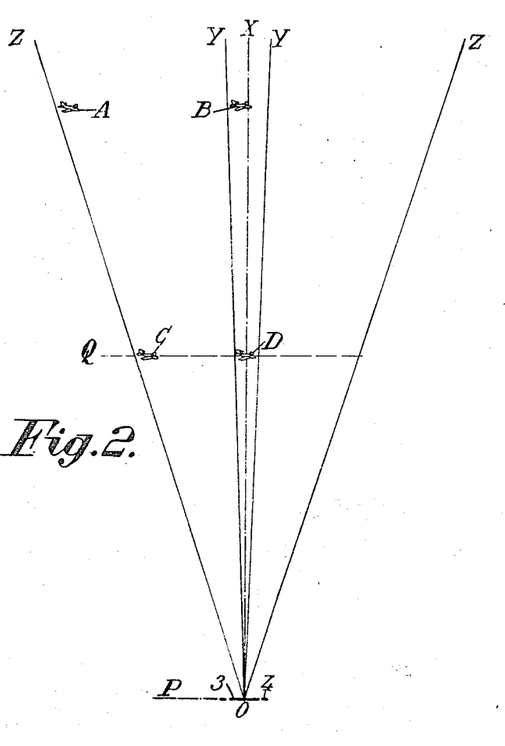
FIG. 2 is a diagram illustrating the operation of the fuze of FIG. 1.

The operation of such a fuze is illustrated by FIG. 2, which is a view in a plane passing through the optical axis OX of the device. The parts of space from which an image (either sharp or blurred) can be formed on the central cell 3, are located inside a cone limited by generatrices OY, whereas the points of space from which can be formed images (either sharp or blurred) on the annular cell 4 are located in the space between said cone and the cone limited by generatrices OZ. The plane where the projectiles are to be caused to burst is indicated at Q.

An aircraft located outside of cone OZ can form no image on either of cells 3 and 4. An aircraft, such as A (in the space between cones OY and OZ) or B (in the space inside cone OY), located at a distance from P greater than the distance at which the projectile is to be made to burst, forms an image which spreads on both of the cells 3 and 4. In such cases the cells therefore balance each other and there is no bursting of the projectile.

But in the case of an aircraft, such as C, located between cones OY and OZ and in plane Q, that is to say at the right distance, the image of this aircraft is formed only on the annular cell 4, which causes an unbalance between the two cells, such that amplifier 8, 9, 10, 11 supplies a current to the primer of detonator 7, which causes the projectile to burst.

Finally, an aircraft, such as D, located inside cone OY and in plane Q forms an image only on the central cell 3 which causes an unbalance between the cells in a direction such that the amplifier does not respond to such an unbalance. But, the apex angle of cone OY is sufficiently small to make sure that in this case the projectile strikes aircraft D directly and therefore exploded under the effect of an ordinary percussion fuze.

Of course, I may provide a modification according to which amplifier 8, 9, 10, 11 is connected with terminals 5 and 6 in the reverse fashion so as to cause the projectile to explode only for an aircraft located inside the cone OY and in this case of course the apex angle of this cone will be greater than in the preceding case.

The arrangement according to this modification might also be used to control a device for automatically recording the correct firing of the guns of an aircraft. In this case, the electric signal, instead of operating a detonator, such as 7, will act on a recording device of the usual type and a switch (not shown) will be provided so as to connect battery 11 with the circuit just when firing takes place. The recording device might easily differentiate shots fired at the correct distance (plane Q of FIG. 2) and in the correct direction (cone OY).

The two above described transistor amplifier arrangements, that is to say that shown on FIG. 1 and that obtained by reversing it as above stated, may be juxtaposed in the same proximity fuze. In this way the projectile will be caused to burst whenever there is an optical unbalance due to the projectile being at a predetermined distance from the target, that is to say, both for an aircraft as shown at C and for one as shown at D on FIG. 2, whether the target is dark on a light background or light on a dark background.

Figure 3:
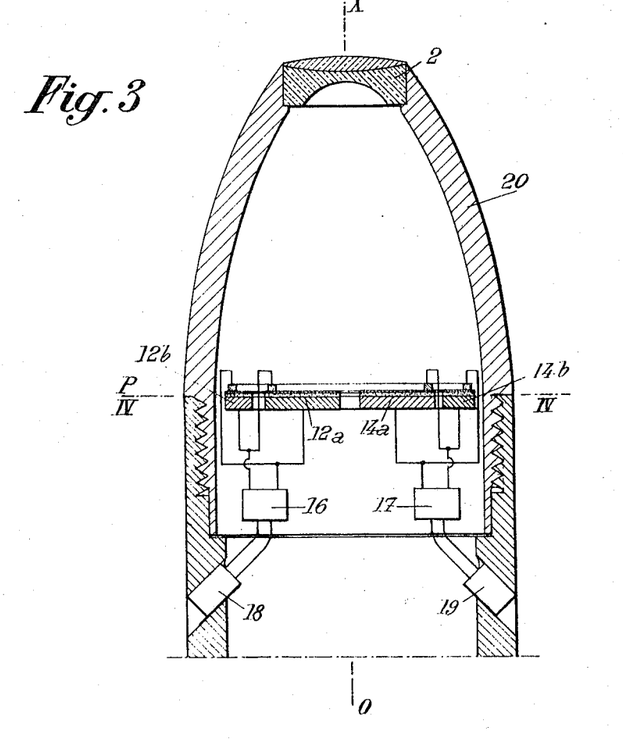
FIGS. 3 and 4 show, respectively in part axial section and in transverse section on the line IV—IV of FIG. 3, a projectile provided with means according to my invention for automatically correcting its direction.
Figure 4:
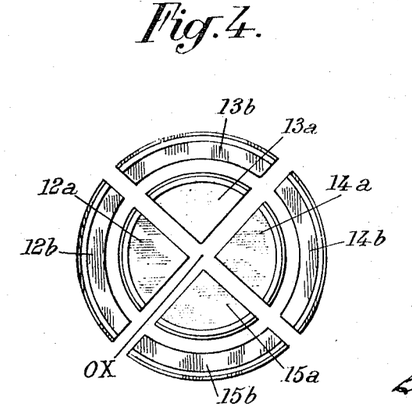

The device shown on FIGS. 3 and 4 is intended to bring correction to the direction of a projectile. This device includes a plurality of pairs of cells 12a–12b, 13a–13b, 14a–14b and 15a–15b, analogous to the pair of cells 3 and 4 of FIG. 1. The pairs of cells are uniformly distributed about the optical axis OX of objective 2, and there for instance four such pairs as illustrated by FIG. 4. One cell of every pair (i.e. one of the cells 12b, 13b, 14b and 15b) is located on the outer side of the corresponding one of its pair with respect to the optical axis OX. Every pair of cells includes a current amplifier, such as 16 or 17, FIG. 3, responsive only to an unbalance produced by the presence of an image limited to the external cell of the pair. Every amplifier is connected with a system capable of deflecting the projectile in the axial plane thereof corresponding to the space scanned by the corresponding pair of cells. The systems in question may be constituted each by a propelling powder charge such as 18, 19, ignited by electric means. Every propelling charge is disposed in the head 20 of the projectile in the axial plane thereof which is bisecting the two cells of the corresponding pair of cells and it is inclined rearwardly and outwardly as visible on FIG. 3.

The operation of the device of FIGS. 3 and 4 is also illustrated by FIG. 2. On the one hand, when the projectile is moving toward an aircraft, such as D, located in the common object plane of all the systems of cells, the image of this aircraft is formed only one one of the inner cells 12a, 13a, 14a and 15a. The arrangement is such that the optical unbalance between the two cells of the pair that is concerned produces no result.

On the other hand, when the projectile is moving toward an aircraft, such as C, located in the same plane Q as the above considered aircraft D, the image of this aircraft C is formed exclusively on one or several of the external cells 12b, 13b, 14b and 15b.

For instance it will be supposed that the aircraft C is located in the section of space scanned by the pair of cells 14a, 14b. The current created by the optical unbalance between these two cells, is amplified by amplifier 17 and causes ignition of the propelling charge 19. As a consequence of this, the head 20 of the projectile is inclined toward the left of FIG. 3, that is to say in the direction which tends to bring the axis OX of the projectile closer to said aircraft C. Bursting of the projectile is subsequently produced either by the current supplied by amplifier 17, with a suitable delay with respect to the ignition of the deflecting charge 19 or by percussion or by any other suitable way.

The devices as above described with referenc to FIGS. 1 to 4 work normally during the day time, that is to say when the target is sufficiently illuminated by the day light. In order to permit using them during the night, will be necessary to provide for the firing of a burst of series of projectiles, each series including a given amount, for instance 10%, of nonexplosive projectiles emitting frontwardly a given radiation during their flight so as to illuminate the target.

I will now describe the application of my invention to devices for measuring or indicating the distance of objects of any dimension which are not outlined against a background of uniform illumination. The problem in this case is to scan a portion of the object which is sufficiently large to make sure that there is in this portion the object a zone including areas of sharply different illuminations.

I may for this purpose dispose in the image plane of the objective a kind of mosaic constituted by a multiplicity of pairs of cells connected in parallel. With such an arrangement an object located in the plane conjugate of said image plane with respect to the objective will practically always produce an unbalance in at least one of said pairs of cells. Such an arrangement could advantageous be used in the case of a range finding device where the focal length of the objective could be varied at will. By varying this distance as this is commonly done in the case of camera objectives, it would be easy to determine the distance producing the above mentioned optical unbalance and the distance of the objective could be deduced therefrom.

In most cases it is more advantageous to provide the device with means for successively directing onto the same pair of cells light rays coming from different portions of the object, so as to increase the probability of receiving the image of a portion of the object where there are two areas of sharply different illuminations.

If a device according to my invention is to be used in connection with dark objects, for instance during the night or by foggy weather, I provide this device with a source of luminous or infra-red rays capable of projecting a parallel beam of rays in the direction of the optical axis of the objective, the section of this beam having a non-circular shape, for instance being cross shaped. As a consequence of this there is formed on the target a luminous spot in the form of a cross and in the image plane an image which also has the shape of a cross and therefore supplies on the cells the dark and light areas capable of producing the desired optical unbalance between said cells.

Figure 5:
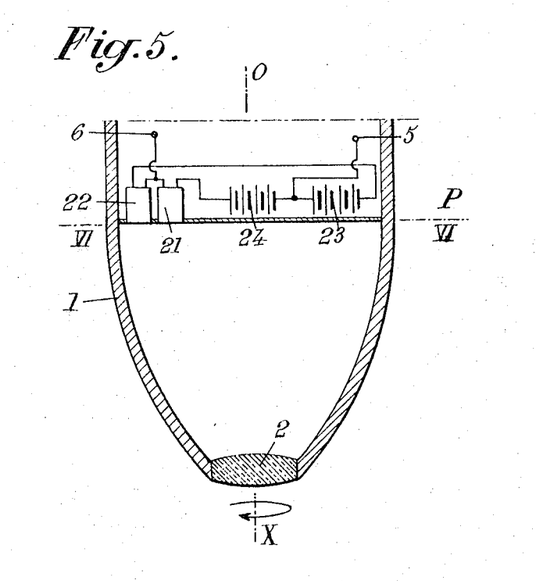
FIGS. 5 and 6 are, respectively, a part axial sectional view and a transverse sectional view on the line VI—VI of FIG. 5, of a proximity fuze made according to another embodiment of my invention.
Figure 6:
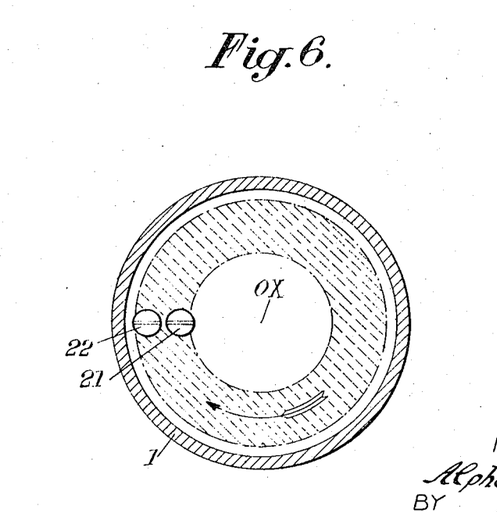

According to a first solution, my device is given a movement of rotation about the optical axis of the objective and the two photo-sensitive cells are disposed close to each other and at some distance from said optical axis. This solution is particularly advantageous in the case of proximity fuzes for projectiles having a movement of rotation about their longitudinal axis. Such a fuze is shown by FIGS. 5 and 6. As in the case of FIG. 1 this fuze includes a casing 1 and an objective 2, this objective preferably having a small field depth. The projectile moves on its trajectory with a movement of rotation about its longitudinal axis OX. Instead of locating the two photo-electric cells concentrically as in the case of FIG. 1, the centers of these cells are distinct and located on a line intersecting axis OX, as shown by FIG. 6. These two cells, designated by reference numerals 21 and 22 on FIGS. 5 and 6, may be junction cells having the advantage, owing to their extremely small active surfaces, of making it possible to compare the illuminations of areas of an image located very close to each other. These cells, which are supplied with current from batteries 23 and 24 have their bias circuits connected in opposition with terminals 5 and 6 which are themselves connected with a transistor amplifier and a detonator analogous to those (7 to 11) of FIG. 1.

The operation of the fuze of FIGS. 5 and 6 is as follows. When a projectile is moving along its trajectory, while rotating about its axis, there is formed in the image plane of the objective an image of the target (or of the luminous spot projected onto said target) said target being for instance the ground. As this image is rotating with respect to the projectile (due to the rotation of said projectile about is axis with respect to the target) cells 21 and 22 thus scan the annular portion of the target which corresponds to the annular image indicated by the cross hatched section of FIG. 6. When the projectile is at a distance from the target higher than the desired distance, the image received by the pair of cells is blurred and there is no sharp contrast of illumination in this image, so that no unbalance can be produced between the two cells. But when a projectile is at a distance just equal to the desired one, the image becomes sharp in the image plane and some portion of the scanned area necessarily produces a contrast between the illuminations of the two cells, which causes the projectile to be burst.

In the second solution, the device is given a translatory movement transverse to its optical axis. This solution is particularly advantageous in the case of an altimetric device for an aircraft. It suffices to direct this device toward the ground and the displacement of the aircraft causes the objective to scan the strip of the ground above which the aircraft is flying.

Figure 7:
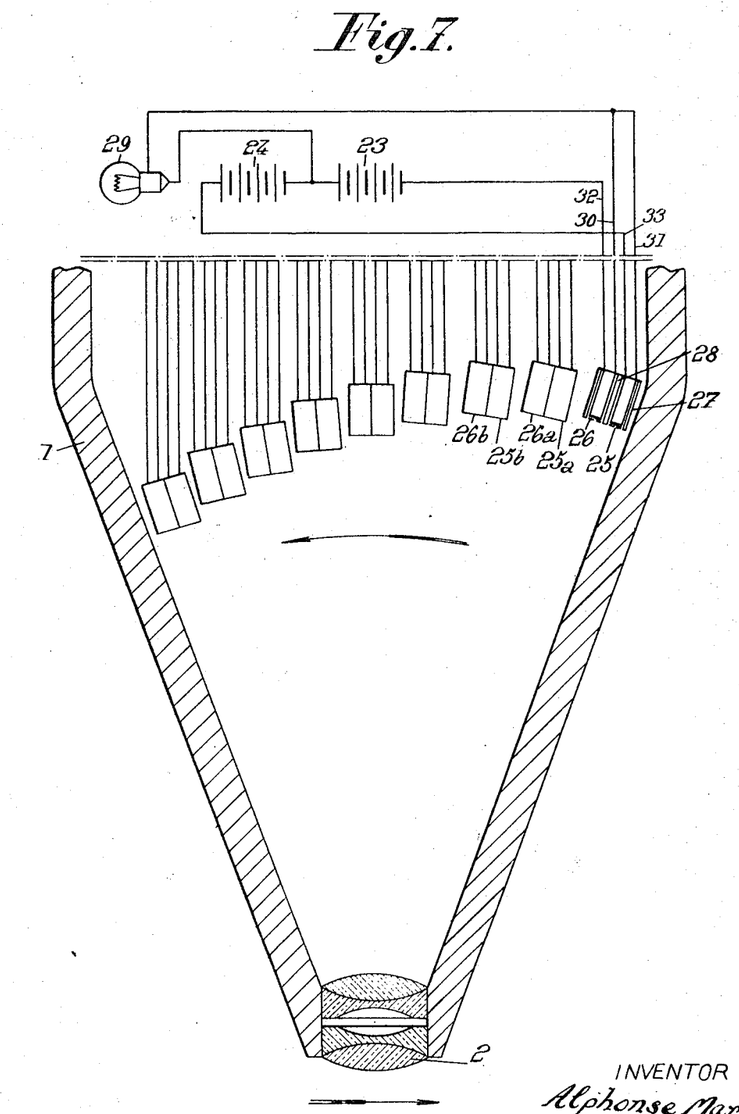
FIG. 7 is a part axial sectional view of an altitude measuring device made according to my invention.

In the altimetric device illustrated by FIG. 7, a single objective 2 cooperates with a plurality of pairs of cells such as 25 and 26, 25a and 26a, 25b and 26b and so on, the respective distances of which from the objective 2 vary from one pair of cells to the next one, said pairs of cells being juxtaposed along a line located in a vertical plane passing through the axis of the objective and parallel to the fore and aft direction of the aircraft. Each of these pairs of cells is combined with an indicator devise as above described. The two cells of each pair are for instance identical and juxtaposed and they may be photo-conductive cells of the germanium junction type. But it seems more advantageous to combine two such cells in the same cylindrical holder 27, said cells being separated from each other by an insulating sheet 28. Two batteries 23 and 24 supply the bias currents. A signal lamp 29 (or other signalling or recording device) has its terminals connected respectively with one point of a conductor extending between two terminals of opposed polarities of said batteries 23 and 24 and with the two output electrodes 30 and 31 of the cells, whereas the inputs 32 and 33 of these cells are connected respectively with the other terminals of said batteries. All the signal lamps, such as 29, are located on the instrument board of the aircraft.

The operation of the altimetric device of FIG. 7 is as follows. If two cells of one pair, such as 25 and 26, are subjected to the same illumination which is the case when they receive a blurred image, they do not supply a bias current. But, if one pair is located at a distance from the objective conjugate of the distance from said objective to the ground there is produced, every time a sharp illumination contrast exists on the ground, an unbalance between said cells which permits a bias current to flow, whereby the corresponding signal lamp 29 is illuminated. When an aircraft is flying at low altitude in the direction indicated by the lower arrow of FIG. 7, the image of the ground is moving along the series of pairs of cells in the direction of the upper arrow. The only pair which is at a distance conjugate from the altitude of the aircraft receives a sharp image which causes a current to pass through the corresponding signal lamp 29.

According to a third solution, applicable to the case where my device is fixed with respect to the object the distance of which from said device is to be measured, or is moving only in the direction of its optical axis with respect to said object, I make use of a mirror having a reciprocating movement and arranged in such manner as to reflect successively on a plurality of pairs of photo-sensitive cells a light beam coming from the objective.

Figure 8:
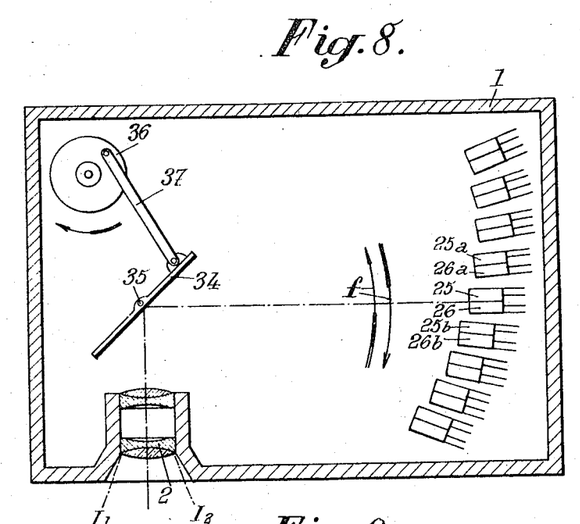
FIGS. 8 and 9 show respectively two other embodiments of altitude measuring devices made according to my invention.

FIG. 8 shows an altimeter especially adapted for use on a helicopter and made according to this solution. This altimeter comprises a plurality of pairs of photo-sensitive cells 25 and 26, 25a and 26a, and so on, scanned by a light beam from the objective reflected by an oscillating mirror 34 and disposed so that the respective optical paths from the objective to said pairs of cells are different as in the case of FIG. 7, each pair of cells being connected to an indicator device such as a signal lamp 29 as already described. Mirror 24 is given its oscillating movement about axis 35 (located substantially in its plane) by means of a rotating disc 36 and a connecting rod 37. Thus, the light beam reflected by the mirror scans the whole of the pairs of cells as indicated by the two arrows f and each of the pairs of cells as 25 and 26, successively receives all the light rays from an incident light beam diagrammatically illustrated by its limits $I_1$ and $I_2$ on FIG. 8. The operation of this altimeter is identical to that of FIG. 7 with the exception of the above stated scanning device.

Figure 9:
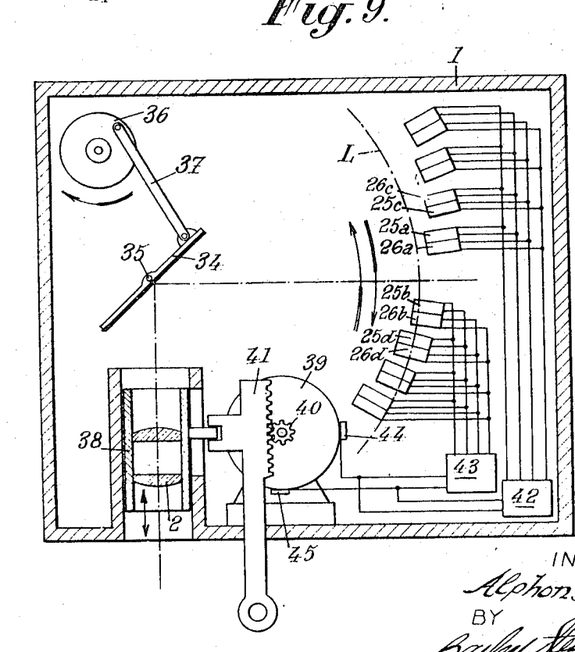

FIG. 9 shows a range finding device suitable for use as an altimeter intended to measure distances within a range extending on either side of a given mean distance. This altimeter includes an objective 2 the amount 38 of which is slideable along a line parallel to its optical axis, in casing 1, by means of a motor 39 acting through a pinion 40 and a rack 41. An oscillating mirror 34 analogous to that of FIG. 8, reflects the incident beam onto pairs of cells, forming two distinct rows in line with each other, with an interval between said rows. The pairs of cells of the upper row (25a–26a, 25c–26c, etc.) have their faces at a distance from the center of mirror 34 greater than the radius of a circular arc L in dotted lines and the pairs of cells of the lower row (25b–26b, 25d–26d, etc.) have their faces at a distance from the center of mirror 34 shorter than said radius. The cells of the two respective rows are connected together in parallel with amplifiers 42 and 43 (for instance of the transistor type as shown on FIG. 1). The outputs of these amplifiers are connected with the input terminals 44 and 45 of motor 39 so that when current is fed from amplifier 42, motor 39 is rotated in the direction which moves the objective 2 downwardly whereas, when current is fed from amplifier 43, motor 39 causes said objective 2 to move upwardly.

The operation of the altimeter of FIG. 9 is as follows. If the distance from the center of mirror 34 at which a sharp image could be formed by the objective is equal to radius L, both of the pairs of cells of the two rows receive blurred images, and there is no optical unbalance due to a sufficient light contrast on the surfaces of said pairs of cells. No bias current is produced, motor 39 is not energized and objective 2 remains stationary. But, if the distance from the sharp image formed by objective 2 to the center of mirror 34 is greater than L, there is one of the pairs of cells of the upper row on which said sharp image is formed and the contrast between areas of different illuminations is such that there is a bias current supplied to amplifier 42, which causes motor 39 to work in the direction which moves the objective 2 away from mirror 34 (that is to say which moves said objective 2 in the downward direction) until the distance between the center of mirror 34 and the sharp image given by the objective becomes equal to radius L. If, on the contrary, the distance from the center of mirror 34 to the sharp image given by the objective 2 is smaller than L, the motor is caused to rotate in the opposed direction until this distance is once more equal to L. Thus, the position of the objective 2 with respect to casing 1 indicates the distance of the object from said objective.

An equivalent operation would be obtained if, instead of moving the objective with respect to the casing, the displacements were imparted to the whole of the pairs of cells mounted in said casing. In this case the distance of the object would be indicated by the position of said system of cells.

In the preceding description it has been supposed first, that the target was of limited dimensions and was outlined against a background of substantially uniform illumination, then that the target was of practically unlimited dimensions.

I may also, according to the present invention, transform the second case into the first one by providing my device with a source of light rays (or infra-red rays) capable of forming upon any opaque element as may be located in the object plane a luminous spot of predetermined shape and by giving to one of the cells of the pair, called "sharpness cell," a shape and a dimension substantially identical to those of the sharp image that is obtained from said spot in the image plane, the other cell, which will be called "balancing cell," being located close to the first one.

Such an arrangement has the advantage that, owing to a suitable choice of the wavelength of the source and to an adaptation of the photo-sensitive cells to this single wavelength, it is possible to make the device still more independent of the ambient illumination or of the effects of light sources as may be present in the field of the device.

Such a source of light rays may be constituted by an arc lamp, by a chemical mixture burning to give an intense light and generally by all devices giving a powerful illumination. Advantageously, this source is arranged in such manner as to emit a light beam of annular section, for instance by making use of an annular mirror of substantially parabolic shape. In thise case, the "sharpness cell" should be of annular shape and the "balancing cell" should be divided into two cells connected in parallel and disposed respectively on the inside and on the outside of the "sharpness cell."

Figure 10:
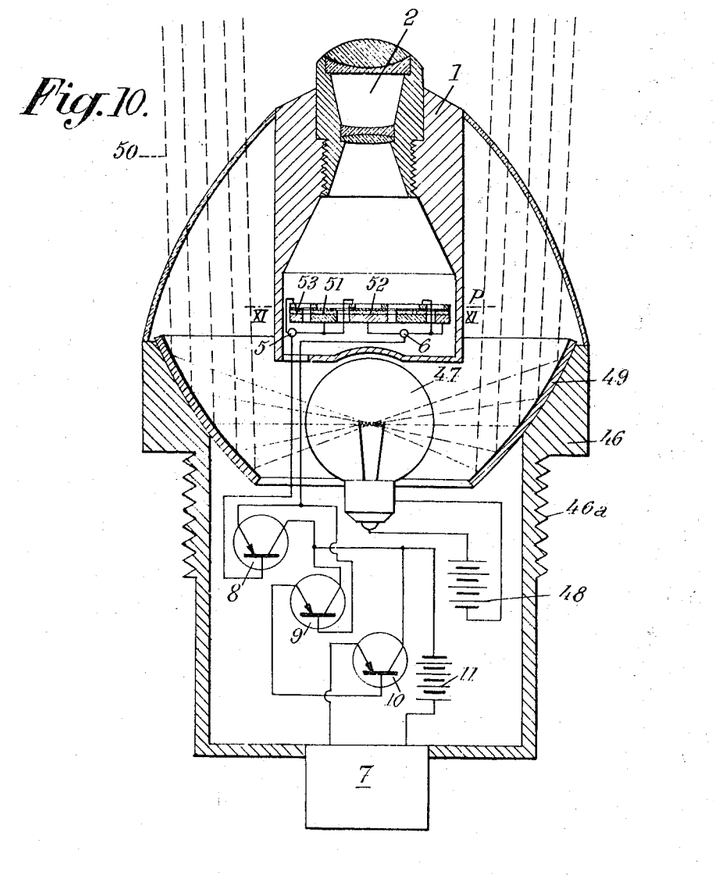
FIGS. 10 and 11 are, respectively, an axial section and a cross-section of a proximity fuze made according to another modification of the device of FIG. 1.
Figure 11:
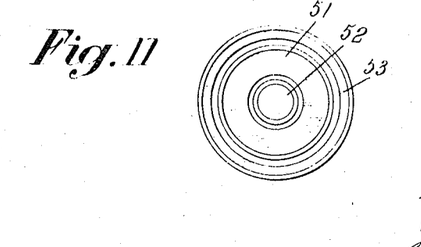

A proximity fuze including a device of this kind is shown on FIGS. 10 and 11. On these figures reference numeral 1 designates the casing of the receiving optical system, which is different from the main casing 46 intended to be fitted through a threaded portion 46a on the body of the projectile. The objective 2 is a teleobjective having preferably a small field depth.

The light emitting system consists of a bulb 47, a battery 48 and a parabolic annular mirror 49 which sends an annular beam 50 toward the front of the projectile. The receiving system includes an annular "sharpness cell" 51 and two balancing cells, one 52 of circular shape and located inside the "sharpness cell" 51, and the other 53 disposed around said "sharpness cell" 51, cells 52 and 53 being connected together. Cell 51 on the one hand, and the whole of cells 52 and 53 on the other hand, are connected with terminals 5 and 6 in the same manner as the cells 4 and 3 of FIG. 1, the amplifier 8, 9, 10, 11 and the detonator 7 being themselves identical to those designated by the same reference characters on Fig. 1.

The operation of the fuze of FIGS. 10 and 11 is as follows. When the beam emitted by the device meets no obstacle, the cells, to wit 51 and 52–53, are similarly illuminated and nothing takes place. When the beam strikes an obstacle located at a distance from the device greater than that for which a sharp image can be formed in the plane of the cells, cells 51 on the one hand and 52–53 on the other hand receive the same light flux due to the formation of a blurred image in their plane. There is no difference of potential between terminals 5 and 6. But, if the obstacle struck by the light beam is at a distance such that the light spot formed on said obstacle gives a sharp image in the plane of the cells, this image is formed mostly on cell 51, whereby an optical unbalance is produced and a current is created between terminals 5 and 6, which current, suitably amplified, causes the projectile to burst under the action of detonator 40. Bursting will be obtained when the projectile is at the desired distance from the obstacle independently of variations of the surrounding illumination both in daytime and by night.

The annular shape of the light beam emitted from the device, and of the "sharpness cell" 51, has been chosen merely by way of example and I might quite as well make use of another suitable shape, for instance, these elements might be cross shaped. I might also make use of a combination of several separate beams and of pairs of cells disposed in similar fashion.

The device illustrated by FIGS. 10 and 11 might, of course, instead of being mounted on a movable structure, such as a projectile, be located at a fixed point, so as to operate any suitable system when a movable object reaches a predetermined distance from said device.

The field of scanning of the annular "sharpness cell" 51 is constituted by a volume limited by a surface 54, (FIG. 12) of conical shape diverging from the objective 2, this surface 54 necessarily intersecting, in the plane Q conjugate of plane P with respect to the objective, the light beam 50 emitted from the fuze.

Figure 12:
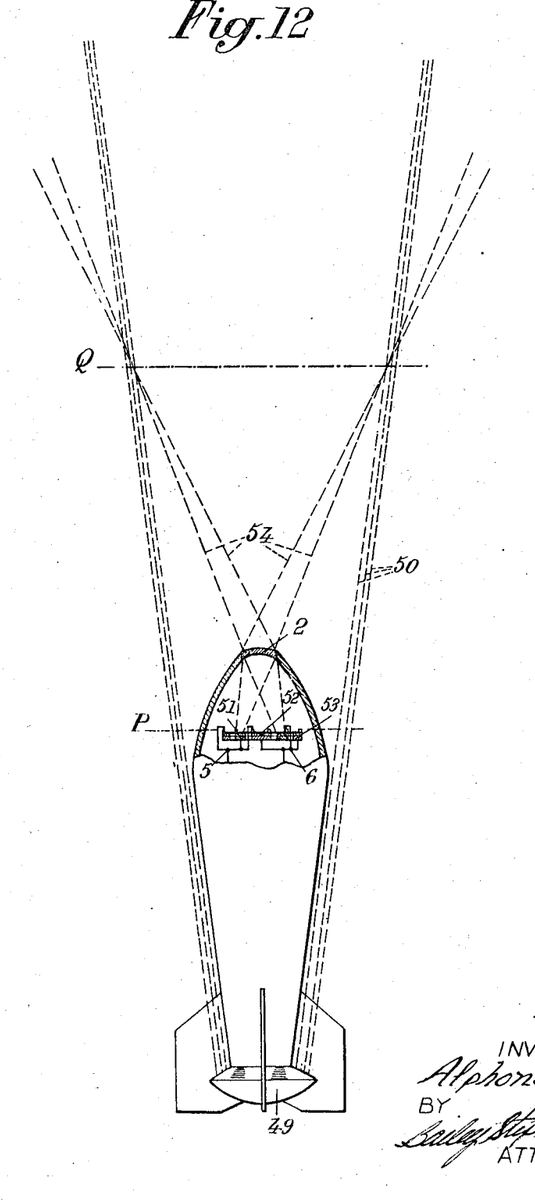
FIG. 12 is an explanatory view relating to FIGS. 10 and 11.

These surfaces 54 and 50 may intersect each other so that their common zone extends over a substantial distance along the axis of the beam. But preferably, and as illustrated by FIG. 12, the apex angle of surface 54 is much greater than that of beam 50 so that the intersection of these two surfaces is practically limited to plane Q, whereby the accuracy of the device is improved.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A distance sensitive device which comprises, in combination, a casing, an objective carried by said casing and capable of forming, in a given image plane having a fixed position in said casing and different from the image focal plane of said objective, a sharp real image of only objects located in an object plane conjugate of said image plane with respect to said objective and located at a given finite distance ahead of said objective, at least one pair of photo-electric elements carried by said casing inside it, said two photo-electric elements having each a light receiving surface, the respective light receiving surfaces of said two elements being located in said image plane so as to receive simultaneously the light rays transmitted at any given instant through said objective, said two light receiving surfaces being at a distance from each other smaller than the minimum distance that can exist in a blurred image between a light point and a dark point thereof, electrical means having input terminals and output terminals for producing a signal across said output terminals in response to a voltage difference produced across said input terminals, and means for connecting the respective outputs of said photo-electric elements with the input terminals of said electrical means in inverse relations respectively so as to achieve a differential action of said pair of photo-electric elements on said electrical means, whereby a signal is delivered by said electrical means only when one of said light receiving surfaces is illuminated while the other is not, which can take place only when a sharp image of an object is formed in said image plane, that is to say when said object is located, ahead of said objective, at a distance therefrom equal to said given distance from the object plane to the objective.

2. A distance sensitive device according to claim 1 for objects of unlimited dimensions, comprising means for successively directing onto said pair of light receiving surfaces the light rays coming from different zones of the object in order to increase the probability of receiving on said surfaces the image of a zone containing two adjoining areas of sharply different illuminations.

3. A distance sensitive device according to claim 2, in which said casing has a movement of rotation about the optical axis of said objective and said surfaces are disposed close to each other and at a distance from said optical axis.

References Cited

UNITED STATES PATENTS

| | | | |
|---|---|---|---|
| 685,957 | 11/1901 | Tesla | 250—42 |
| 2,708,387 | 5/1955 | Broida et al. | 250—42 |
| 2,462,118 | 2/1949 | Minkler | 102—70.2 |
| 2,681,008 | 6/1954 | Allen | 102—70.2 |
| 2,377,589 | 6/1945 | Sutcliffe | 244—14.3 |
| 2,423,885 | 7/1947 | Hammond | 244—14.3 |
| 2,838,600 | 6/1958 | Salinger | 250—234 |
| 2,813,983 | 11/1957 | Hammar. | |

FOREIGN PATENTS

| | | |
|---|---|---|
| 159,839 | 11/1954 | Australia. |
| 772,531 | 4/1957 | Great Britain. |

RODNEY D. BENNETT, Jr., Primary Examiner

MALCOLM F. HUBLER, Assistant Examiner

U.S. Cl. X.R.

244—3.16

UNITED STATES PATENT OFFICE
CERTIFICATE OF CORRECTION

Patent No. 3,455,243　　　　　　　　　　Dated July 15, 1969

Inventor(s)　Alphonse Martin

It is certified that error appears in the above-identified patent and that said Letters Patent are hereby corrected as shown below:

Column 1, line 7, for "1965" read "1955".

SIGNED AND
SEALED
DEC 15 1970

(SEAL)
Attest:

Edward M. Fletcher, Jr.
Attesting Officer

WILLIAM E. SCHUYLER, JR.
Commissioner of Patents